(12) United States Patent
Song et al.

(10) Patent No.: US 12,306,395 B2
(45) Date of Patent: May 20, 2025

(54) ELECTRONIC DEVICE SYNCHRONIZING LENS DRIVING INFORMATION AND IMAGES

(71) Applicant: SAMSUNG ELECTRONICS CO., LTD., Suwon-si (KR)

(72) Inventors: Jinwoo Song, Suwon-si (KR); Kawang Kang, Suwon-si (KR); Dongsoo Kim, Suwon-si (KR); Youngjun Shin, Suwon-si (KR); Sangwon Ahn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 45 days.

(21) Appl. No.: 18/086,413

(22) Filed: Dec. 21, 2022

(65) Prior Publication Data

US 2023/0122998 A1 Apr. 20, 2023

Related U.S. Application Data

(63) Continuation of application No. PCT/KR2022/006800, filed on May 12, 2022.

(30) Foreign Application Priority Data

May 27, 2021 (KR) .................. 10-2021-0068452

(51) Int. Cl.
*G02B 26/00* (2006.01)
*G02B 3/14* (2006.01)
(Continued)

(52) U.S. Cl.
CPC ............. *G02B 26/004* (2013.01); *G02B 3/14* (2013.01); *G02B 27/646* (2013.01); *G03B 5/00* (2013.01);
(Continued)

(58) Field of Classification Search
CPC ...... G02B 26/004; G02B 3/14; G02B 27/646; G02B 3/12; G03B 5/00; G03B 13/36;
(Continued)

(56) References Cited

U.S. PATENT DOCUMENTS 9,778,480 B2 10/2017 Ollila
10,051,183 B2 8/2018 Yoneda et al.
(Continued)

FOREIGN PATENT DOCUMENTS

JP 5259172 B2 8/2013
JP 6500238 B2 4/2019
(Continued)

OTHER PUBLICATIONS

Communication dated Aug. 18, 2022, issued by the International Searching Authority in counterpart International Application No. PCT/KR2022/006800 (PCT/ISA/210).
(Continued)

*Primary Examiner* — Yogesh K Aggarwal
(74) *Attorney, Agent, or Firm* — Sughrue Mion, PLLC

(57) ABSTRACT

An electronic device includes a lens, an image sensor configured to generate image data from incident light that is incident through the lens, an actuator configured to drive the lens, at least one processor configured to output a first signal including lens driving information for controlling the actuator to drive the lens, a first interface configured to present, by the at least one processor, the first signal to the actuator, and a second interface configured to present, by the at least one processor, the first signal to the image sensor.

20 Claims, 11 Drawing Sheets

(51) Int. Cl.
  *G02B 27/64* (2006.01)
  *G03B 5/00* (2021.01)
  *G03B 13/36* (2021.01)
  *G03B 30/00* (2021.01)
  *H04N 23/68* (2023.01)

(52) U.S. Cl.
  CPC ............. *G03B 13/36* (2013.01); *G03B 30/00* (2021.01); *H04N 23/687* (2023.01)

(58) Field of Classification Search
  CPC .. G03B 30/00; G03B 3/10; G03B 2205/0007; H04N 23/687; H04N 23/57; H04N 23/665; H04N 23/67; H04N 23/6812; H04N 23/683; H04N 23/81; G06F 13/42; G06F 13/4282
  See application file for complete search history.

(56) References Cited

U.S. PATENT DOCUMENTS

| | | | |
|---|---|---|---|
| 10,348,969 | B2 | 7/2019 | Murakami et al. |
| 10,613,342 | B2 | 4/2020 | Kasamatsu |
| 10,750,090 | B2 | 8/2020 | Murashima |
| 11,323,610 | B2 | 5/2022 | Yoon et al. |
| 11,378,814 | B2 | 7/2022 | Choi et al. |
| 11,627,244 | B1* | 4/2023 | Dhanda .................. H04N 23/57 348/349 |
| 2009/0160952 | A1 | 6/2009 | Nakakuki et al. |
| 2012/0287291 | A1 | 11/2012 | McMahon et al. |
| 2014/0333785 | A1 | 11/2014 | Lee |
| 2016/0112612 | A1 | 4/2016 | Kakkori |
| 2018/0139380 | A1 | 5/2018 | Oogami et al. |
| 2018/0149881 | A1 | 5/2018 | Kim et al. |
| 2019/0235202 | A1 | 8/2019 | Smyth et al. |
| 2019/0306430 | A1 | 10/2019 | Kunick et al. |
| 2020/0116975 | A1 | 4/2020 | Sakamoto |
| 2020/0265603 | A1 | 8/2020 | Yim et al. |
| 2020/0374428 | A1 | 11/2020 | Saito et al. |
| 2021/0208417 | A1* | 7/2021 | Choi .................... H04N 23/687 |
| 2021/0382263 | A1 | 12/2021 | Lee et al. |

FOREIGN PATENT DOCUMENTS

| | | |
|---|---|---|
| JP | 2019-106655 A | 6/2019 |
| JP | 6654658 B2 | 2/2020 |
| JP | 2020-64283 A | 4/2020 |
| KR | 10-2015-0135771 A | 12/2015 |
| KR | 10-2017-0069060 A | 6/2017 |
| KR | 10-2018-0035150 A | 4/2018 |
| KR | 10-2018-0060230 A | 6/2018 |
| KR | 10-2018-0092140 A | 8/2018 |
| KR | 10-1989467 B1 | 6/2019 |
| KR | 10-2019-0090293 A | 8/2019 |
| KR | 10-2019-0132126 A | 11/2019 |
| KR | 10-2019-0136269 A | 12/2019 |
| KR | 10-2020-0036264 A | 4/2020 |
| KR | 10-2020-0070176 A | 6/2020 |
| KR | 10-2020-0090391 A | 7/2020 |
| KR | 10-2020-0100498 A | 8/2020 |
| KR | 10-2020-0101007 A | 8/2020 |
| WO | 2013/049688 A2 | 4/2013 |

OTHER PUBLICATIONS

Communication dated Aug. 18, 2022, issued by the International Searching Authority in counterpart International Application No. PCT/KR2022/006800 (PCT/ISA/237).

Communication dated Oct. 16, 2024, issued by European Patent Office in European Patent Application No. 22811535.8.

Extended European Search Report dated Mar. 5, 2025, issued by the European Patent Office in European Application No. 22811535.8.

* cited by examiner

ELECTRONIC DEVICE SYNCHRONIZING LENS DRIVING INFORMATION AND IMAGES

CROSS-REFERENCE TO RELATED APPLICATION(S)

This application is a by-pass continuation of International Application No. PCT/KR2022/006800, filed on May 12, 2022, in the Korean Intellectual Property Receiving Office, which is based on and claims priority to Korean Patent Application No. 10-2021-0068452, filed on May 27, 2021, in the Korean Intellectual Property Office, the disclosures of which are incorporated by reference herein in their entireties.

SUMMARY

1. Field

The disclosure relates to a technique for synchronizing lens driving information and image data.

2. Description of Related Art

Recently, as the functions of mobile devices are diversified, the demand for improvement of image capturing functions using the mobile devices is also increasing. Accordingly, an image processing technique such as correcting a shake of an electronic device occurring during image capturing or reducing a noise included in an image is being developed.

The electronic device can perform video digital image stabilization (VDIS) for a plurality of image frames. VDIS is a method of reducing a shake of a video through digital processing, and a processor can correct the plurality of image frames through VDIS.

The electronic device can perform temporal noise reduction (TNR) for the plurality of image frames. TNR is a method of removing a noise temporally generated between the plurality of image frames, based on a current image frame and a previous image frame.

An actuator for driving a lens and an image sensor for acquiring image data are independent, and lens driving information controlling the actuator and the image data are difficult to be synchronized. When the electronic device performs image processing without optical image stabilization (OIS) or auto focus (AF) related information included in the lens driving information, there is a problem in that accurate image processing is difficult.

SUMMARY

Additional aspects will be set forth in part in the description which follows and, in part, will be apparent from the description, or may be learned by practice of the presented embodiments.

According to an aspect of an example embodiment, an electronic device may include a lens, an image sensor configured to generate image data from incident light that is incident through the lens, an actuator configured to drive the lens, at least one processor configured to output a first signal including lens driving information for controlling the actuator to drive the lens, a first interface configured to present, by the at least one processor, the first signal to the actuator, and a second interface configured to present, by the at least one processor, the first signal to the image sensor.

The actuator may include an auto focus (AF) module and an optical image stabilization (OIS) module.

The lens may include a liquid lens. The at least one processor may be further configured to perform an AF function by controlling the AF module to deform a shape of the liquid lens, and perform an OIS function by controlling the OIS module to deform the shape of the liquid lens.

The electronic device may include a motion sensor configured to detect a movement of the electronic device. The at least one processor may be configured to acquire, from the motion sensor, motion data corresponding to the movement of the electronic device, and perform, based on the motion data, an OIS function by controlling the OIS module to move a position of the lens.

The first interface and the second interface may include a common section.

The first interface and the second interface may be at least one of an inter-integrated circuit (I2C), an improved inter-integrated circuit (I3C), or a serial peripheral interface (SPI).

The image sensor may be configured to generate the image data from the incident light, acquire the first signal from the at least one processor through the second interface, and generate an image frame comprising the image data and the lens driving information.

The electronic device may include a third interface configured to present, by the image sensor, the image frame to the at least one processor.

The third interface may include a mobile industry processor interface (MIPI). The lens driving information may include first lens driving information acquired by the image sensor from the at least one processor before exposure of the image sensor, and second lens driving information acquired from the at least one processor before reading-out of the image data after exposure of the image sensor, and the lens driving information may be included in an embedded header or embedded footer of the image frame.

The image frame may include the image data corresponding to a plurality of lines, and the lens driving information may be included in a packet header or packet footer of each of the plurality of lines.

The at least one processor may include an application processor (AP) and an OIS control circuit, the AP may be configured to control the AF module to perform an AF function, and the OIS control circuit may be configured to control the OIS module to perform an OIS function.

The AP may be further configured to generate a second signal for controlling the image sensor and present the second signal to the image sensor through a fourth interface.

According to an aspect of an example embodiment, an electronic device may include a lens, an image sensor configured to generate image data from incident light that is incident through the lens, an actuator configured to drive the lens, at least one processor configured to output a first signal including lens driving information for controlling the actuator to drive the lens, a first interface configured to present, by the at least one processor, the first signal to the actuator, and a second interface configured to acquire, by the image sensor and from the actuator, lens position information corresponding to a position of the lens.

The actuator may include a Hall sensor configured to detect the position of the lens, and the image sensor may be further configured to request, to the actuator through the second interface, the lens position information and in response to the request, receive, from the actuator through the second interface, the lens position information acquired by the Hall sensor.

According to an aspect of an example embodiment, an electronic device may include a lens, an image sensor configured to generate image data from incident light that is incident through the lens, an actuator configured to drive the lens, and at least one processor connected by an interface with the image sensor and the actuator. The at least one processor may be configured to present, to the actuator through at least a first path of the interface, a first signal comprising lens driving information for controlling the actuator to drive the lens, present, through at least a second path of the interface, the first signal to the image sensor, and acquire, from the image sensor, an image frame comprising the image data and the lens driving information.

The at least one processor may be configured to perform at least one of video digital image stabilization (VDIS), temporal noise reduction (TNR), chromatic aberration correction, or lens distortion correction, for the image data, based on the lens driving information.

The lens driving information may include at least one of AF position information for performing, by the at least one processor, an AF function through the actuator, or OIS position information for performing, by the at least one processor, an OIS function through the actuator.

The lens driving information may include first lens driving information acquired by the image sensor from the at least one processor before exposure of the image sensor, and second lens driving information acquired from the at least one processor before reading-out of the image data after exposure of the image sensor, and the lens driving information may be included in an embedded header or embedded footer of the image frame.

The image frame may include the image data corresponding to a plurality of lines, and the lens driving information may be included in a packet header or packet footer region of each of the plurality of lines.

According to various embodiments disclosed in the present disclosure, video digital image stabilization (VDIS), temporal noise reduction (TNR), chromatic aberration correction, lens distortion correction, etc., may be performed for image data, based on lens driving information synchronized with image data. An electronic device may perform precise image processing by using together motion data acquired through a motion sensor and the lens driving information synchronized with the image data.

Effects obtainable in the present disclosure are not limited to the above-mentioned effects, and other effects not mentioned may be clearly understood by those having ordinary skill in the art to which the present disclosure belongs from the description below.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
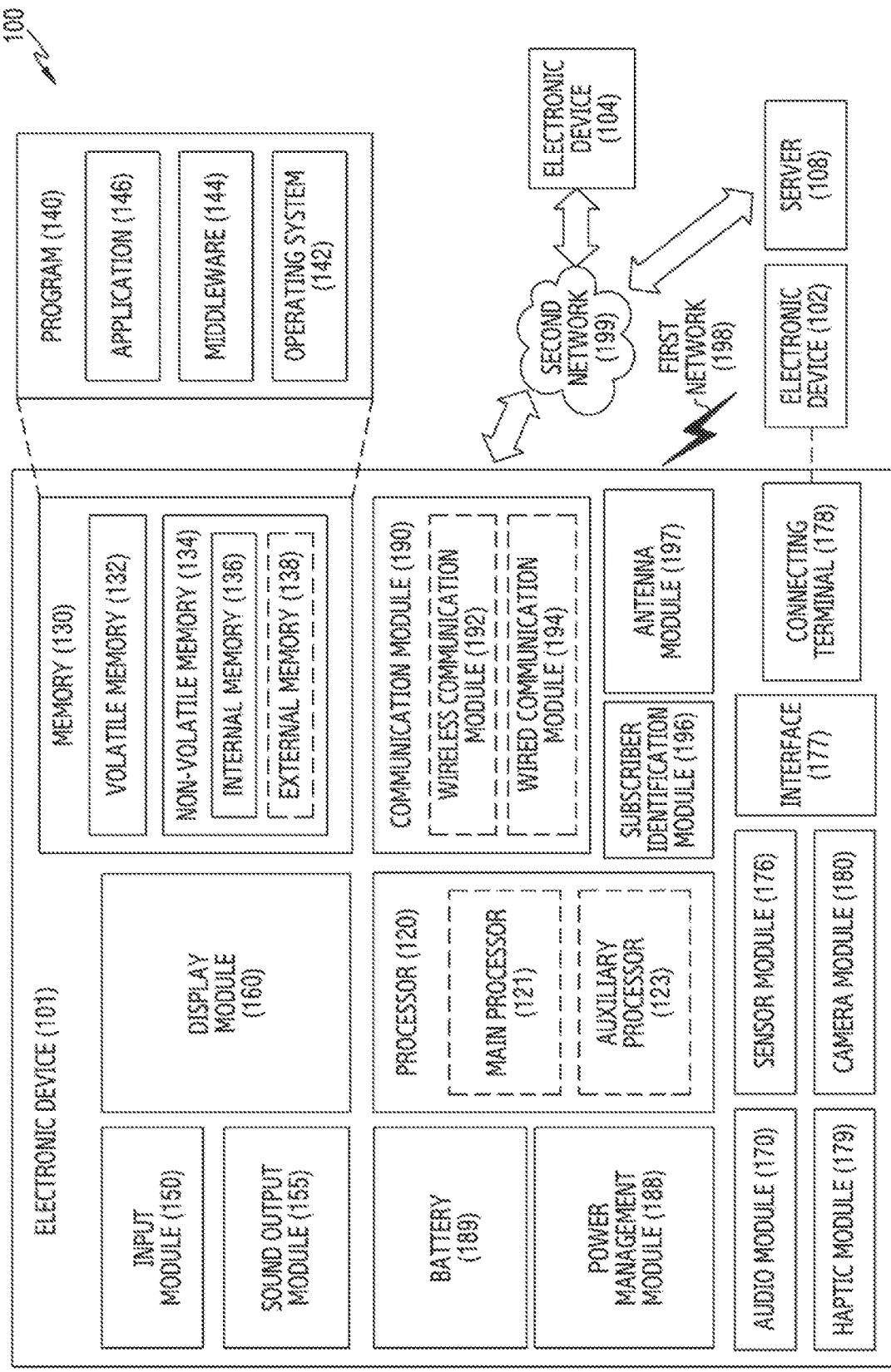
FIG. 1 is a block diagram of an electronic device in a network environment according to an example embodiment.

FIG. 1 is a block diagram illustrating an electronic device 101 in a network environment 100 according to an example embodiment. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
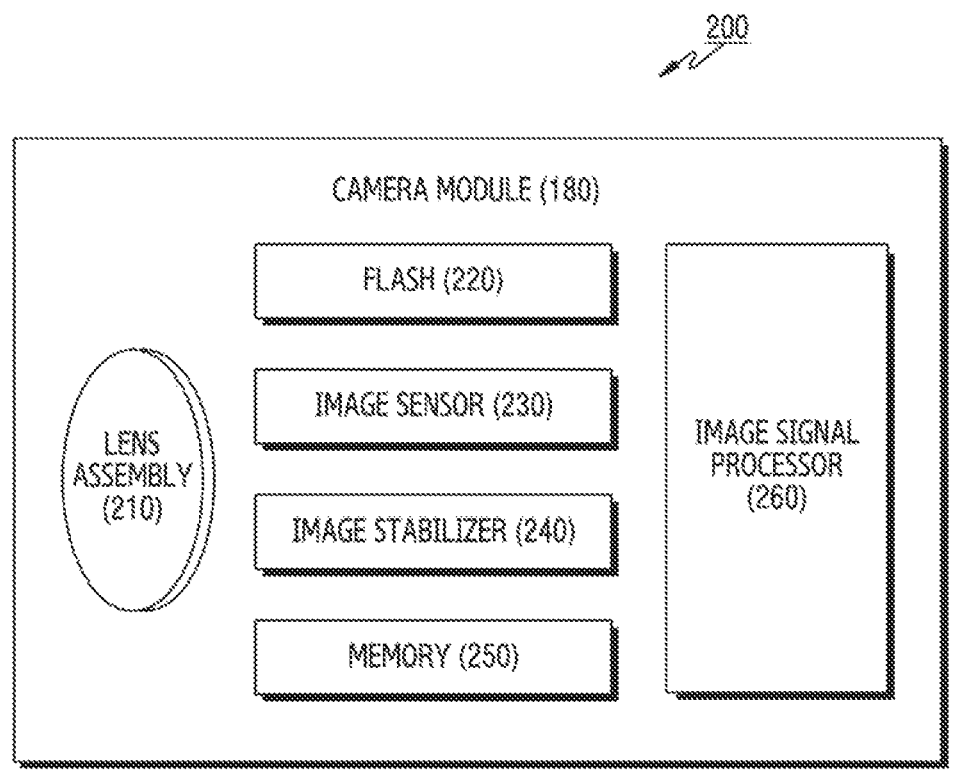
FIG. 2 is a block diagram illustrating a camera module according to an example embodiment.

FIG. 2 is a block diagram 200 illustrating the camera module 180 according to an example embodiment. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an IR LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor or an acceleration sensor disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3A:
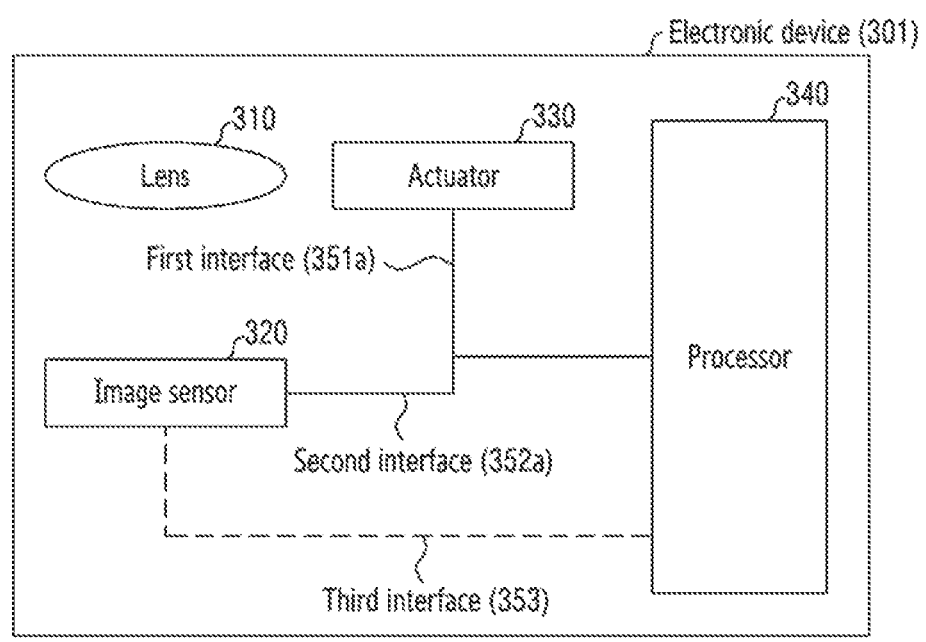
FIG. 3A is a block diagram illustrating a hardware construction of an electronic device including an interface according to an example embodiment.
Figure 3B:
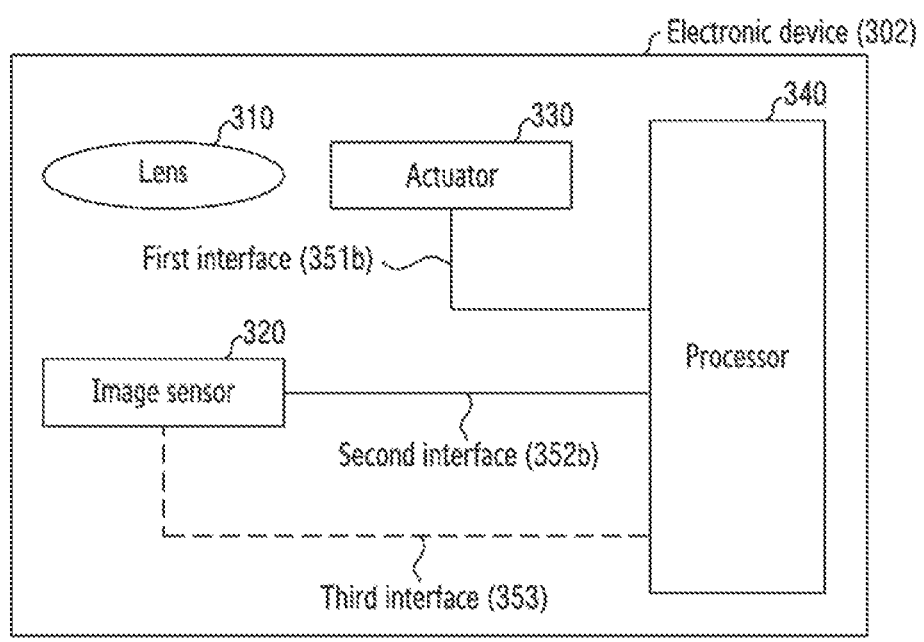
FIG. 3B is a block diagram illustrating a hardware construction of an electronic device including an interface according to an example embodiment.
Figure 3C:
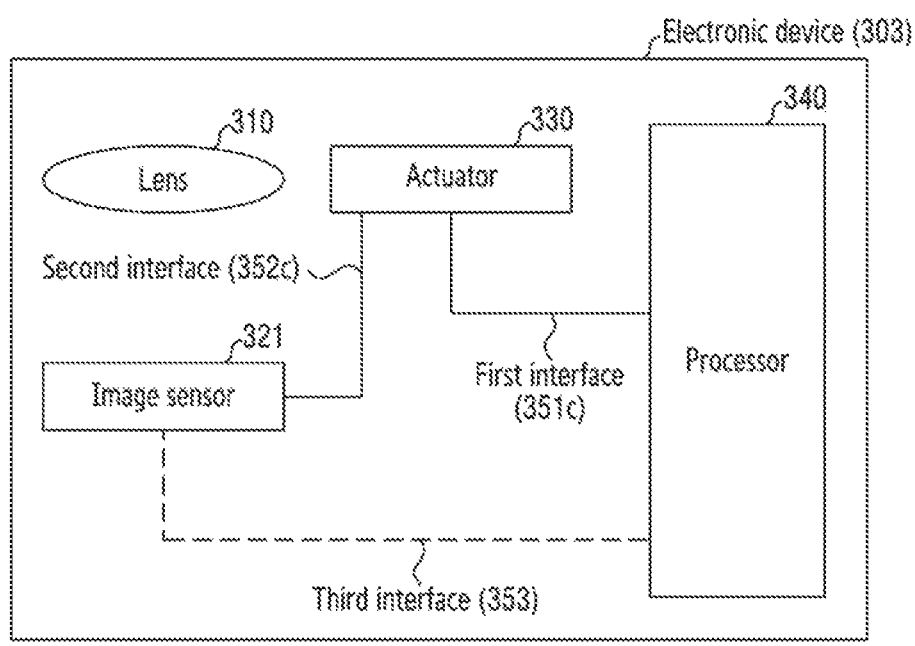
FIG. 3C is a block diagram illustrating a hardware construction of an electronic device including an interface according to an example embodiment.

FIG. 3A is a block diagram illustrating a hardware construction of an electronic device 301 including an interface according to an example embodiment. FIG. 3B is a block diagram illustrating a hardware construction of an electronic device 302 including an interface according to an example embodiment. FIG. 3C is a block diagram illustrating a hardware construction of an electronic device 303 including an interface according to an example embodiment.

Referring to FIG. 3A, FIG. 3B, and FIG. 3C, the electronic devices 301, 302, and 303 may include a lens 310, image sensors 320 and 321, an actuator 330, and a processor 340. In an embodiment, the electronic devices 301, 302, and 303 may be understood as the electronic device 101 illustrated in FIG. 1. In an embodiment, the lens 310 may be understood as the lens assembly 210 illustrated in FIG. 2. In an embodiment, the processor 340 may be understood to include at least one of the processor 120 illustrated in FIG. 1 or the image signal processor 260 illustrated in FIG. 2.

In an embodiment, the lens 310 may be understood as a lens assembly (e.g., the lens assembly 210 of FIG. 2) including at least one lens. In an embodiment, the lens 310 may operate to move forward or backward along an optical axis to change a focal length or capture clearly a target object as a subject.

In an embodiment, the lens 310 may be understood as a liquid lens. In an embodiment, the inside of the lens 310 (e.g., the liquid lens) may include a liquid oil, and the outside of the lens 310 may be formed of a thin film (i.e., a membrane). In an embodiment, a shape of the lens 310 (e.g., the liquid lens) may be deformed. The processor 340 may perform an auto focus (AF) function by controlling the actuator 330 to deform the shape of the lens 310. For example, the actuator 330 may move in an optical axis direction while applying an external force to the lens 310. The outside of the lens 310 may be bent in a direction parallel to an optical axis according to a direction of the external force applied by the actuator 330. In an embodiment, the processor 340 may perform an optical image stabilization (OIS) function by controlling the actuator 330 to deform the shape of the lens 310.

In an embodiment, the image sensors 320 and 321 may be CMOS sensors or CCD sensors. A plurality of individual pixels are integrated in the image sensors 320 and 321, and each individual pixel may include a micro lens, a color filter, and a photodiode. Each individual pixel is a kind of light detector, and may convert incident light into an electrical signal. The light detector generally cannot detect a wavelength of captured light by itself and cannot determine color information. The photo detector may include a photodiode. For example, the image sensors 320 and 321 may amplify an electric current that light received through the lens 310 provides through the photoelectric effect of a light receiving element. For example, each individual pixel may include a photoelectric transformation element (or a position sensitive detector (PSD)) and a plurality of transistors (e.g., a reset transistor, a transfer transistor, a select transistor, and a driver transistor).

In an embodiment, the image sensors 320 and 321 may generate image data from incident light that is incident through the lens 310. The image data may include various color values acquired through a color filter array. For example, the color filter array may include at least one color filter array of an RGB pattern, a red, green, blue, emerald (RGBE) pattern, a cyan, yellow, magenta (CYM) pattern, a cyan, yellow, green, magenta (CYGM) pattern, or a red, green, blue, white (RGBW) pattern.

In an embodiment, the actuator 330 may drive the lens 310. In an embodiment, the actuator 330 may perform an AF function and an OIS function under the control of the processor 340. In an embodiment, the processor 340 may perform the AF function wherein a subject may be captured clearly by moving the lens 310 in an optical axis direction through the actuator 330. For example, the processor 340 may perform the AF function by controlling the actuator 330 to deform a shape of the lens 310 (e.g., the liquid lens). In an embodiment, the processor 340 may perform the OIS function of correcting a shake of the electronic devices 301, 302, and 303 by moving the lens 310 through the actuator 330. For example, the processor 340 may control the OIS function by controlling the actuator 330 to move a position of the lens 310 in a direction opposite to a direction in which the electronic devices 301, 302, and 303 move. For another example, the processor 340 may perform the OIS function by controlling the actuator 330 to deform the shape of the lens 310 (e.g., the liquid lens) as well.

In an embodiment, the processor 340 may include at least one of an OIS control circuit, an AP, and an image signal processor (e.g., the image signal processor 260 of FIG. 2). In an embodiment, the processor 340 may be referred to as at least one processor.

In an embodiment, the processor 340 may output a first signal that includes lens driving information for controlling the actuator 330 to drive the lens 310. For example, the processor 340 may present the first signal to the actuator 330. The actuator 330 may move a position of the lens 310 or deform a shape of the lens 310 (e.g., a liquid lens), based on the lens driving information included in the first signal. For another example, the processor 340 may present the first signal to the image sensor 320. The image sensor 320 may generate an image frame that includes the lens driving information included in the first signal.

In an embodiment, the image sensor 320 may generate an image frame, based on lens driving information included in a first signal obtained from the processor 340. For example, the image sensor 320 may generate image data from incident light that is incident through the lens 310 that is moved (or is shape-changed) based on the lens driving information. The image sensor 320 may acquire the first signal from the processor 340. The image sensor 320 may generate the image frame which includes the image data and the lens driving information included in the first signal. It may be understood that the image data and the lens driving information are synchronized with each other. The image sensor 320 may present the image frame to the processor 340.

In an embodiment, the processor 340 may acquire an image frame including lens driving information from the image sensor 320. In an embodiment, the processor 340 may perform image processing for image data, based on the lens driving information included in the image frame. For example, the processor 340 may perform at least one of video digital image stabilization (VDIS), temporal noise reduction (TNR), chromatic aberration correction, and lens distortion correction, for the image data, based on the lens driving information.

Referring to FIG. 3A, the electronic device 301 may include a first interface 351a connecting the processor 340 and the actuator 330, and a second interface 352a connecting the processor 340 and the image sensor 320. As illustrated, the first interface 351a and the second interface 352a may include a predetermined common section.

In an embodiment, the processor 340 may present a first signal to the actuator 330 through the first interface 351a. The actuator 330 may drive the lens 310, based on lens driving information included in the first signal acquired through the first interface 351a. In an embodiment, the processor 340 may present the first signal to the image sensor 320 through the second interface 352a. The image sensor 320 may generate an image frame, based on lens driving information included in the first signal acquired through the second interface 352a.

Referring to FIG. 3B, the electronic device 302 may include a first interface 351b and a second interface 352b. In an embodiment, the description for the first interface 351a and the second interface 352a described in relation to FIG. 3A may also be applied to the first interface 351b and the second interface 352b illustrated in FIG. 3B except for a description related to arrangement.

Referring to FIG. 3B, the first interface 351b and the second interface 352b may be implemented as separate interfaces without including a common section as well.

Referring to FIG. 3C, the electronic device 303 may include a first interface 351c and a second interface 352c. In an embodiment, unlike FIG. 3A and FIG. 3B, the second interface 352c of FIG. 3C may be an interface connecting the actuator 330 and the image sensor 321. In an embodiment, the processor 340 may present a first signal to the actuator 330 through the first interface 351c. In an embodiment, the image sensor 321 may acquire lens position information from the actuator 330 through the second interface 352c. For example, the actuator 330 may include a Hall sensor capable of detecting a position of the lens 310. The image sensor 321 may request the lens position information to the actuator 330 through the second interface 352c. In response to the request, the image sensor 321 may receive the lens position information acquired by the Hall sensor from the actuator 330 through the second interface 352c. In an embodiment, the image sensor 321 may generate an image frame, based on the lens position information acquired from the actuator 330. For example, it may be understood that image data included in the image frame and the lens position information are synchronized with each other.

Referring to FIG. 3A, FIG. 3B, and FIG. 3C, the electronic devices 301, 302, and 303 may further include a third interface 353 connecting the image sensors 320 and 321 and the processor 340. In an embodiment, the image sensors 320 and 321 may present an image frame to the processor 340 through the third interface 353. For example, the image sensor 320 may generate an image frame which includes image data, and lens driving information acquired from the processor 340, and present the image frame to the processor 340 through the third interface 353. For another example, the image sensor 321 may generate an image frame which includes image data, and lens position information acquired from the actuator 330, and present the image frame to the processor 340 through the third interface 353. In an embodiment, the processor 340 receiving the image frame from the image sensors 320 and 321 through the third interface 353 may be an image signal processor.

In an embodiment, the first interfaces 351a, 351b, and 351c and the second interfaces 352a, 352b, and 352c may be at least one of an inter-integrated circuit (I2C), an improved inter-integrated circuit (I3C), or a serial peripheral interface (SPI). For example, at least one of the first interfaces 351a, 351b, and 351c or the second interfaces 352a, 352b, and 352c may be an interface which supports bidirectional communication. For another example, at least one of the first interfaces 351a, 351b, and 351c or the second interfaces 352a, 352b, and 352c may be an interface which supports unidirectional communication.

In an embodiment, the third interface 353 may be a mobile industry processor interface (MIPI). For example, the third interface 353 may be an interface which supports unidirectional communication from the image sensors 320 and 321 to the processor 340. For another example, the third interface 353 may be an interface which supports bidirectional communication between the image sensors 320 and 321 and the processor 340.

Figure 4:
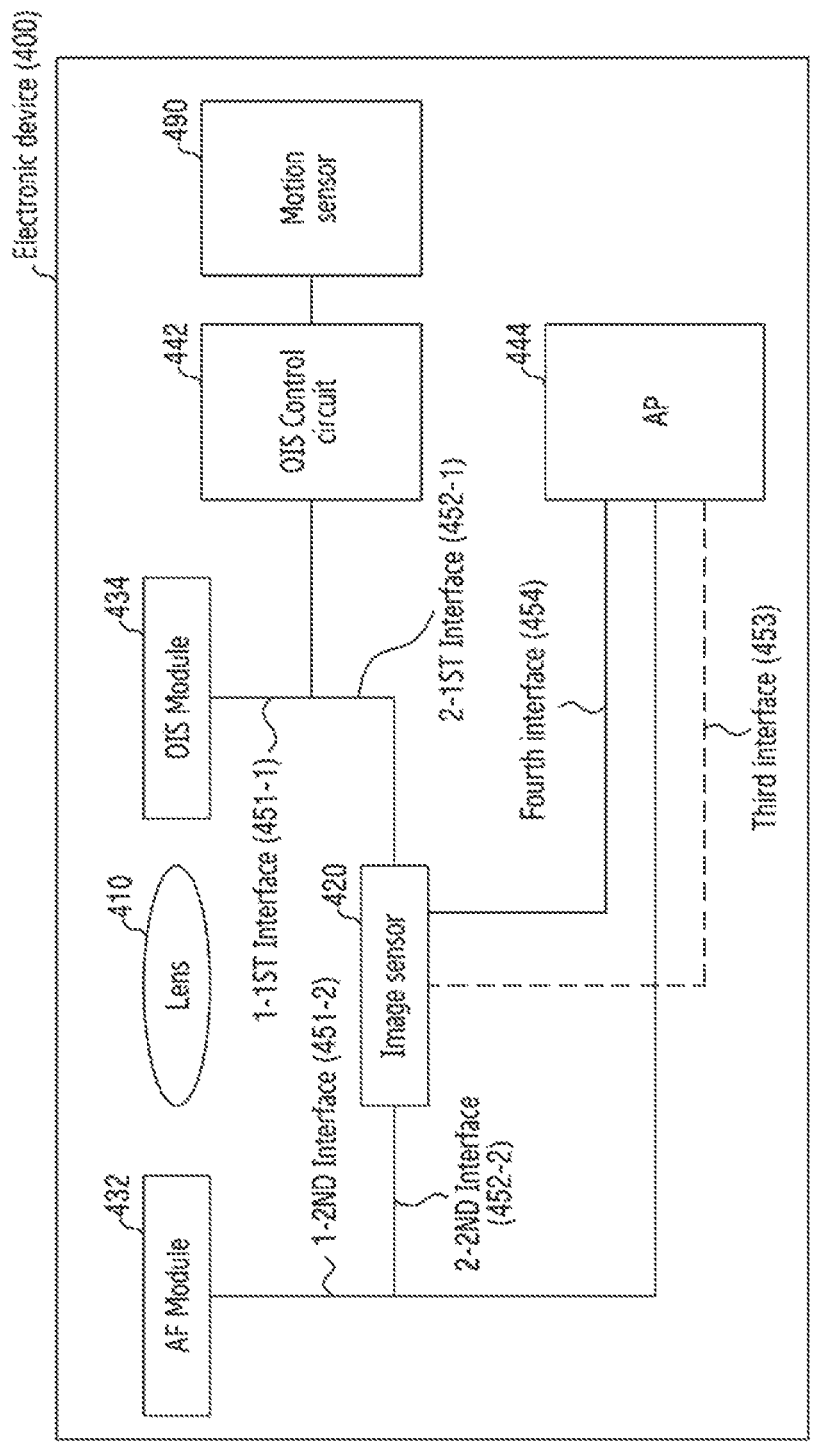
FIG. 4 is a block diagram illustrating a hardware construction of an electronic device including an interface according to an example embodiment.

FIG. 4 is a block diagram illustrating a hardware construction of an electronic device 400 including an interface according to an example embodiment.

Referring to FIG. 4, the electronic device 400 may include a lens 410, an image sensor 420, an AF module 432, an OIS module 434, an OIS control circuit 442, an AP 444, and a motion sensor 490. Among the components illustrated in FIG. 4, the components illustrated in FIG. 3A to FIG. 3C may be briefly described or a description thereof may be omitted.

In an embodiment, the electronic device 400 may include the motion sensor 490. A processor (e.g., the OIS control circuit 442 and the AP 444) may detect a movement of the electronic device 400 through the motion sensor 490. In an embodiment, the motion sensor 490 may present motion data corresponding to the movement of the electronic device 400 to the OIS control circuit 442. For example, the motion sensor 490 may present motion data directly to the OIS control circuit 442. In another embodiment, the AP 444 may acquire information on the movement of the electronic device 400 detected from the motion sensor 490, and present this information to the OIS control circuit 442.

In an embodiment, the motion sensor 490 may include at least one of an acceleration sensor, a gyro sensor (gyroscope), a magnetic sensor, and a Hall sensor. For example, the acceleration sensor may measure an acceleration acting in three axes (e.g., an X axis, a Y axis, or a Z axis) of the electronic device 400. However, the above sensors are exemplary, and the motion sensor 490 may further include at least one other type of sensor.

In an embodiment, the electronic device 400 may include the AF module 432 and the OIS module 434. In an embodiment, the AF module 432 may perform an AF function by driving the lens 410. For example, the AF module 432 may perform the AF function by deforming a shape of the lens 410 (e.g., the liquid lens). For another example, the AF module 432 may perform the AF function by moving a position of the lens 410 as well. In an embodiment, the OIS module 434 may perform an OIS function by driving the lens 410. For example, the OIS module 434 may perform the OIS function by moving the position of the lens 410. For another example, the OIS module 434 may perform the OIS function by deforming the shape of the lens 410 (e.g., the liquid lens) as well.

In an embodiment, the electronic device 400 may include the OIS control circuit 442 and the AP 444. In an embodiment, the AP 444 may be understood to include an image signal processor (e.g., the image signal processor 260 of FIG. 2). In an embodiment, the OIS control circuit 442 and the AP 444 may be arranged as separate components as shown in FIG. 4, and in another embodiment, the OIS control circuit 442 may be arranged within the AP 444 as well. For example, the electronic device 400 may include a system on chip (SoC) in which processing units such as the AP 444, the OIS control circuit 442, and the image signal processor are integrated.

In an embodiment, the OIS control circuit 442 may perform the OIS function by controlling the OIS module 434 to move a position of the lens 410. The OIS control circuit 442 may perform the OIS function by controlling the OIS module 434 to deform a shape of the lens 410 (e.g., the liquid lens). In an embodiment, the OIS control circuit 442 may acquire motion data corresponding to the movement of the electronic device 400 from the motion sensor 490. The OIS control circuit 442 may control the OIS module 434 to move the position of the lens 410, based on the motion data.

In an embodiment, the OIS control circuit 442 may present a 1-1st signal including lens driving information for moving a position of the lens 410, to the OIS module 434 and the image sensor 420. For example, the lens driving information may be OIS position information for enabling the OIS control circuit 442 to move the position of the lens 410. In an embodiment, the OIS control circuit 442 may present the 1-1st signal to the OIS module 434 through a 1-1st interface 451-1. In an embodiment, the OIS control circuit 442 may present the 1-1st signal to the image sensor 420 through a 2-1st interface 452-1. In an embodiment, the 1-1st interface 451-1 and the 2-1st interface 452-1 may have a common section. In an embodiment, the 1-1st interface 451-1 and the 2-1st interface 452-1 may be an I2C, an I3C, or an SPI.

In an embodiment, the AP 444 may perform an AF function by controlling the AF module 432 to drive the lens 410. In an embodiment, the AP 444 may present a 1-2nd signal including lens driving information for driving the lens 410, to the AF module 432 and the image sensor 420. For example, the lens driving information may be AF position information for enabling the AP 444 to deform a shape of the lens 410 (e.g., a liquid lens). In an embodiment, the AP 444 may present the 1-2nd signal to the AF module 432 through a 1-2nd interface 451-2. In an embodiment, the AP 444 may present the 1-2nd signal to the image sensor 420 through a 2-2nd interface 452-2. In an embodiment, the 1-2nd interface 451-2 and the 2-2nd interface 452-2 may have a common section. In an embodiment, the 1-2nd interface 451-2 and the 2-2nd interface 452-2 may be an I2C, an I3C, or an SPI.

In an embodiment, the electronic device 400 may include a third interface 453. In an embodiment, the image sensor 420 may generate an image frame which includes lens driving information included in a 1-1st signal acquired from the OIS control circuit 442 and lens driving information included in a 1-2nd signal acquired from the AP 444. The image sensor 420 may present the image frame to the AP 444 through the third interface 453. For example, the image sensor 420 may present the image frame to an image signal processor included in the AP 444. In an embodiment, the third interface 453 may be an MIPI.

In an embodiment, the electronic device 400 may include a fourth interface 454. In an embodiment, the AP 444 may generate a second signal for controlling the image sensor 420. For example, the second signal may include at least part of information about an exposure time of the image sensor 420 or a time for reading out image data. In an embodiment, the AP 444 may present the second signal to the image sensor 420 through the fourth interface 454. In an embodiment, the fourth interface 454 may be an I2C, an I3C, or an SPI.

Referring to FIG. 3A to FIG. 3C and FIG. 4, the lens 410 of FIG. 4 may correspond to the lens 310 of FIG. 3A to FIG. 3C, and the image sensor 420 of FIG. 4 may correspond to the image sensor 320 of FIG. 3A to FIG. 3B. In an embodiment, the AF module 432 and the OIS module 434 of FIG.

4 may be included in the actuator 330 of FIG. 3A to FIG. 3C. In an embodiment, the OIS control circuit 442 and the AP 444 of FIG. 4 may be included in the processor 340 of FIG. 3A to FIG. 3C. In an embodiment, the 1-1st signal or the 1-2nd signal described in relation to FIG. 4 may correspond to the first signal described in relation to FIG. 3A to FIG. 3C. In an embodiment, the 1-1st interface 451-1 or the 1-2nd interface 451-2 may correspond to the first interface 351a of FIG. 3A. In an embodiment, the 2-1st interface 452-1 or the 2-2nd interface 452-2 may correspond to the second interface 352a of FIG. 3A. In an embodiment, the third interface 453 of FIG. 4 may correspond to the third interface 353 of FIG. 3A to FIG. 3C.

Figure 5:
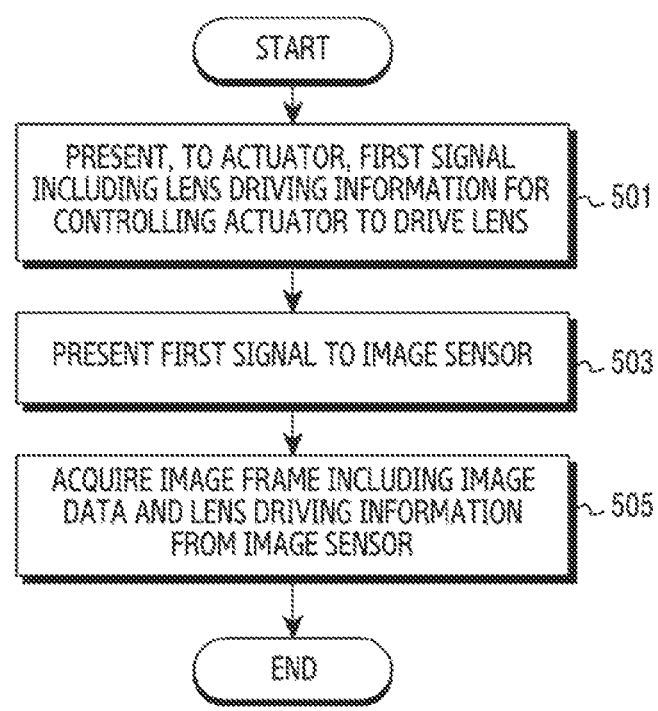
FIG. 5 is a flowchart illustrating an operation in which a processor acquires an image frame including lens driving information according to an example embodiment.

FIG. 5 is a flowchart illustrating an operation in which the processor 340 acquires an image frame including lens driving information according to an example embodiment. The operation described in FIG. 5 may be performed by the processor 340 illustrated in FIG. 3A to FIG. 3C. In an embodiment, the processor 340 may be understood to include the OIS control circuit 442 and the AP 444 shown in FIG. 4.

According to an embodiment, in operation 501, the processor 340 may present, to the actuator 330, a first signal which includes lens driving information for controlling the actuator 330 to drive the lens 310.

In an embodiment, the processor 340 may present the first signal to the actuator 330 through at least a first path.

In an embodiment, the processor 340 may present the first signal to the actuator 330 through the first interface 351a of FIG. 3A, the first interface 351b of FIG. 3B, or the first interface 351c of FIG. 3C. In an embodiment, a section of the first interface 351a of FIG. 3A excluding a common section with the second interface 352a may be referred to as a first path. In another embodiment, the first interface 351b of FIG. 3B and the first interface 351c of FIG. 3C may be referred to as a first path.

In an embodiment, the OIS control circuit 442 may present a 1-1st signal to the OIS module 434 through the 1-1st interface 451-1 of FIG. 4. In an embodiment, the AP 444 may present a 1-2nd signal to the AF module 432 through the 1-2nd interface 451-2 of FIG. 4. In an embodiment, a section of the 1-1st interface 451-1 of FIG. 4 excluding a common section with the 2-1st interface 452-1 may be referred to as a first path. In an embodiment, a section of the 1-2nd interface 451-2 of FIG. 4 excluding a common section with the 2-2nd interface 452-2 may be referred to as a first path.

According to an embodiment, in operation 503, the processor 340 may present the first signal to the image sensor 320.

In an embodiment, the processor 340 may present the first signal to the image sensor 320 through at least a second path.

In an embodiment, the processor 340 may present the first signal to the actuator 330 through the second interface 352a of FIG. 3A or the second interface 352b of FIG. 3B. In an embodiment, a section of the second interface 352a of FIG. 3A excluding a common section with the first interface 351a may be referred to as a second path. In another embodiment, the second interface 352b of FIG. 3B may be referred to as a second path.

In an embodiment, the image sensor 321 may receive lens position information corresponding to the lens driving information included in the first signal through the second interface 352c of FIG. 3C as well. The second interface 352c of FIG. 3C may be referred to as a second path.

In an embodiment, the OIS control circuit 442 may present a 1-1st signal to the OIS module 434 through the 2-1st interface 452-1 of FIG. 4. In an embodiment, the AP 444 may present a 1-2nd signal to the AF module 432 through the 2-2nd interface 452-2 of FIG. 4. In an embodiment, a section of the 2-1st interface 452-1 of FIG. 4 excluding a common section with the 1-1st interface 451-1 may be referred to as a second path. In an embodiment, a section of the 2-2nd interface 452-2 of FIG. 4 excluding a common section with the 1-2nd interface 451-2 may be referred to as a second path.

According to an embodiment, in operation 505, the processor 340 may acquire an image frame which includes image data and the lens driving information, from the image sensors 320 and 321. According to an embodiment, the image data may be understood as image data which is acquired to correspond to the first signal (or lens driving information) by the image sensors 320 and 321. For example, it may be understood that the image data and lens driving information included in the image frame which is acquired by the processor 340 in operation 505 are synchronized with each other.

In an embodiment, the processor 340 (or the AP 444) may acquire the image frame from the image sensors 320 and 321 through the third interface 353.

Figure 6:
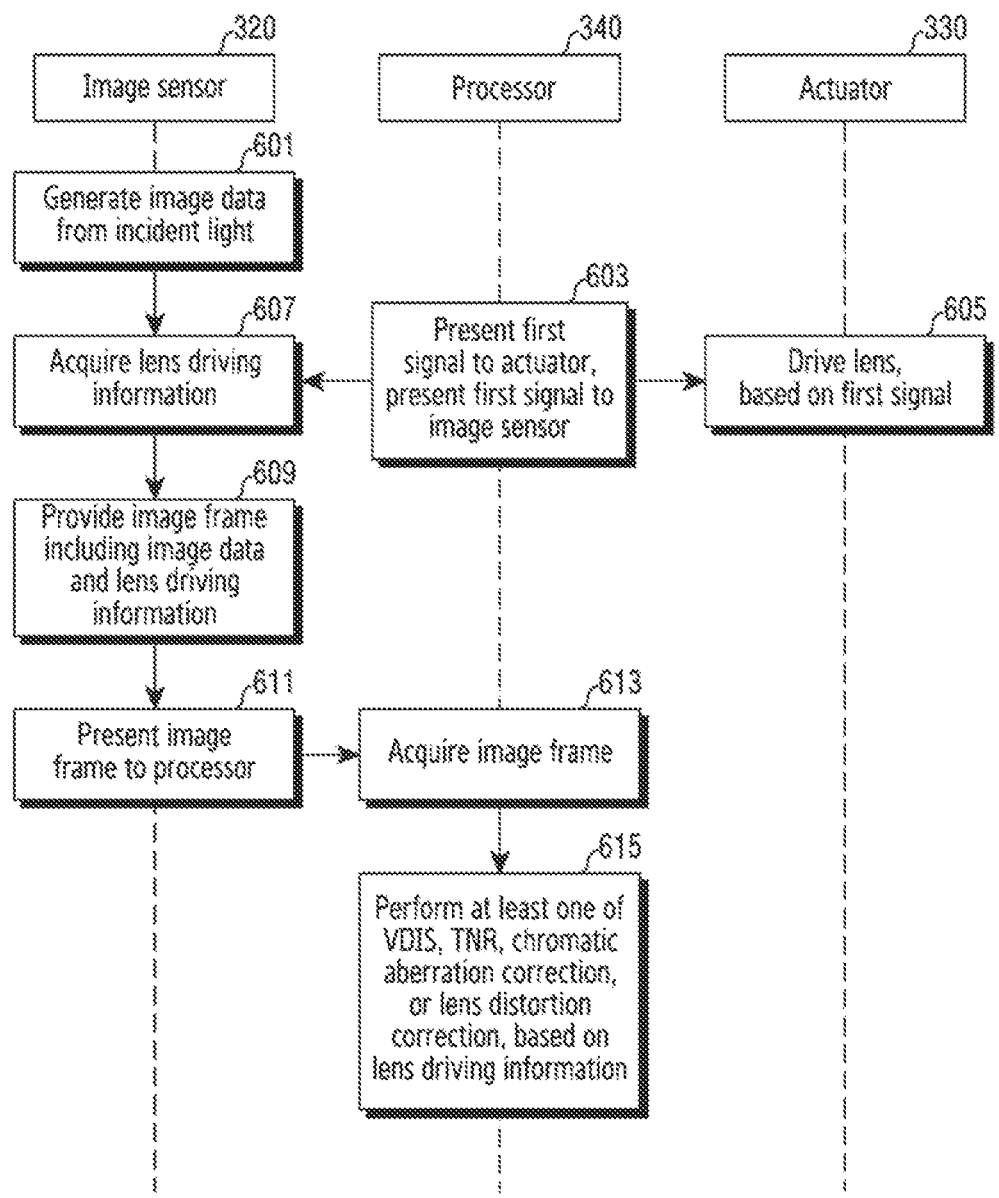
FIG. 6 is a ladder diagram illustrating operations of an image sensor, a processor, and an actuator according to an example embodiment.

FIG. 6 is a ladder diagram illustrating operations of the image sensor 320, the processor 340, and the actuator 330 according to an example embodiment. The operations described in FIG. 6 may be performed by the image sensor 320, the processor 340, and the actuator 330 illustrated in FIG. 3A and FIG. 3B.

According to an embodiment, in operation 601, the image sensor 320 may generate image data from incident light.

According to an embodiment, in operation 603, the processor 340 may present a first signal to the actuator 330 and present the first signal to the image sensor 320. Operation 603 may correspond to operation 501 and operation 503 described in FIG. 5.

According to an embodiment, in operation 605, the actuator 330 may drive the lens 310, based on the first signal. For example, the actuator 330 may move a position of the lens 310 or deform a shape of the lens 310, based on lens driving information included in the first signal. In relation to FIG. 6, although operation 603 and operation 605 are shown to be performed after operation 601, this is for convenience of description and does not determine the order of operations. For example, the image data generated in operation 601 may be acquired in a position of the lens 310 which is driven by the actuator 330 in operation 605.

According to an embodiment, in operation 607, the image sensor 320 may acquire lens driving information from the processor 340. The image sensor 320 may acquire the lens driving information included in the first signal received from the processor 340.

According to an embodiment, in operation 609, the image sensor 320 may generate an image frame which includes the image data and the lens driving information.

According to an embodiment, in operation 611, the image sensor 320 may present the image frame to the processor 340.

According to an embodiment, in operation 613, the processor 340 may acquire the image frame from the image sensor 320.

According to an embodiment, in operation 615, the processor 340 may perform at least one of VDIS, TNR, chromatic aberration correction (CAC), or lens distortion correction (LDC), for the image data, based on the lens driving information included in the image frame.

In an embodiment, the processor 340 may perform VDIS or electric image stabilization (EIS) for the image data, based on the lens driving information. In an embodiment, the processor 340 may acquire motion data corresponding to a movement of the electronic device 400 through a motion sensor (e.g., the motion sensor 490 of FIG. 4). The processor 340 may perform an OIS function by controlling the actuator 330 to move the lens 310, based on the motion data. The processor 340 may use a motion compensation value corresponding to a value compensating the motion data through the OIS function, together with the motion data, in order to perform VDIS for image frames for which OIS has been carried out. Since the lens driving information included in the image frame includes information corresponding to the motion compensation value, the processor 340 may perform VDIS for the image data, based on the lens driving information.

In an embodiment, the processor 340 may perform TNR for a plurality of image frames acquired from the image sensor 320. For example, the processor 340 may reduce a noise included in the plurality of image frames by applying a filter (e.g., a Gaussian filter and/or an average filter) to the plurality of image frames. In an embodiment, the processor 340 may acquire a motion compensation value corresponding to a value compensating the motion data through the OIS function, through the lens driving information included in the image frame. The processor 340 may perform TNR for a plurality of image frames, based on the motion data, and the motion compensation value corresponding to the lens driving information.

In an embodiment, regarding the incident light incident through the lens 310 (e.g., the liquid lens), a position of image forming may vary according to a color (e.g., R, G, B) of the incident light, that is, according to a wavelength of the incident light. For example, while the processor 340 performs the AF function or the OIS function by deforming a shape of the lens 310, an incidence angle at which the incident light passes through the lens 310 may change. As the shape of the lens 310 is deformed, an image is formed in a different position every color of the incident light, so chromatic aberration may occur. In an embodiment, the image frame received by the processor 340 may include information about the deformed shape (e.g., angle) of the lens 310. The processor 340 may perform chromatic aberration correction for image data by using the lens driving information. The processor 340 may perform the chromatic aberration correction for the image data by using the lens driving information synchronized with the image data.

In an embodiment, the processor 340 may perform lens distortion correction for image data acquired from the image sensor 320. When the lens 310 is a lens capable of optical zooming, a barrel distortion degree of the lens 310 may vary according to a focal length. In an embodiment, since the processor 340 acquires the lens driving information synchronized with the image data together, the processor 340 may correct barrel distortion included in the image data, based on the lens driving information.

Figure 7:
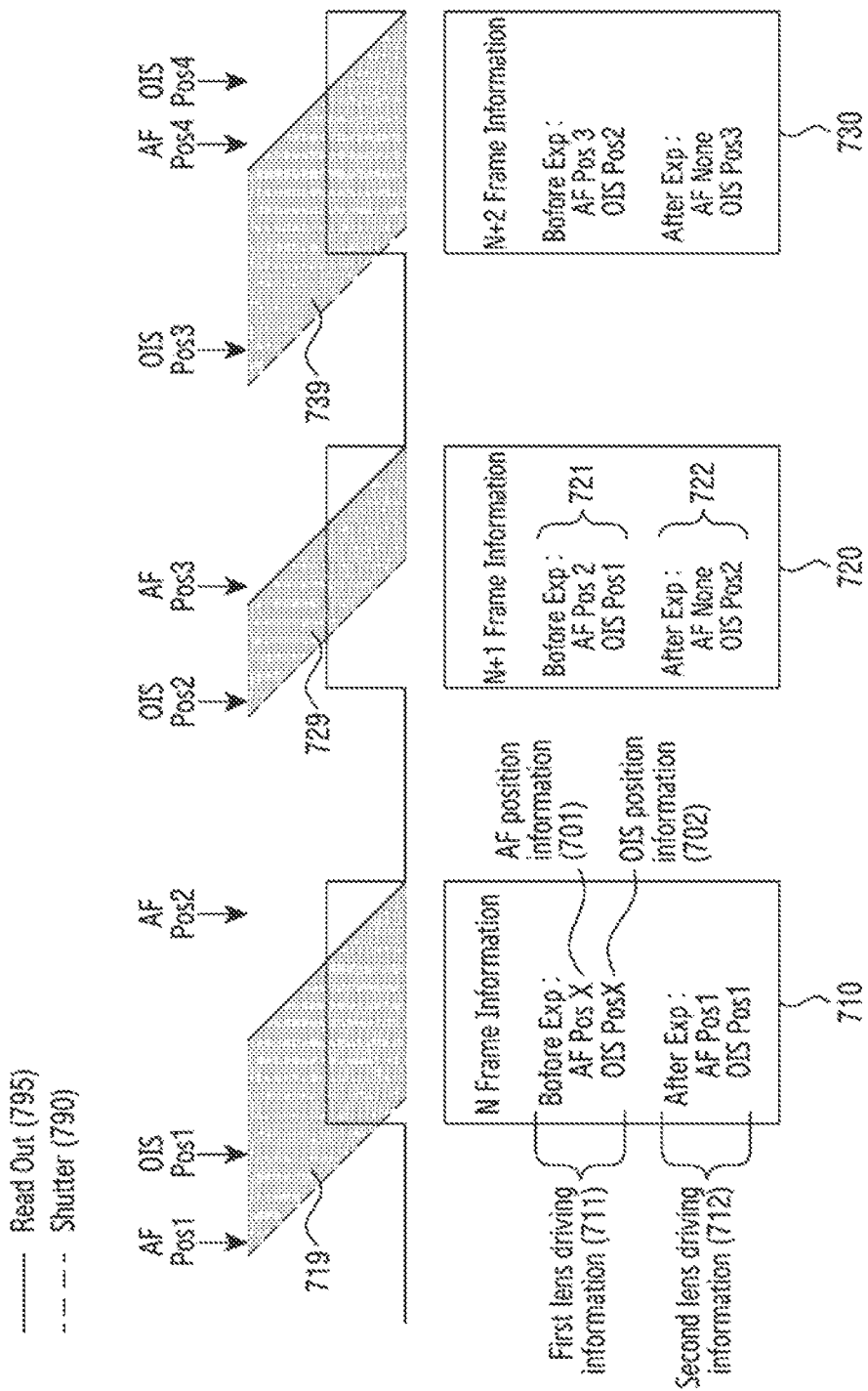
FIG. 7 is a diagram of an example of lens driving information according to an example embodiment.

FIG. 7 is a diagram of an example of lens driving information according to an example embodiment.

In an embodiment, the image sensor 320 may present an image frame including lens driving information, together with image data, to the processor 340. For example, the image sensor 320 may present N frame information 710, together with N frame image data, to the processor 340, and the N frame information 710 may include the lens driving information.

Referring to FIG. 7, a shutter 790 indicates a time point at which exposure of the image sensor 320 starts, and a read out 795 indicates a time point at which image data is read out from the image sensor 320. For example, in FIG. 7, an Nth exposure 719 may correspond to a section between the Nth shutter 790 and the Nth read out 795. The Nth exposure 719, an N+1st exposure 729, and an N+2nd exposure 739 may correspond to different exposure time. As a time interval between the shutter 790 and the read out 795 is varied, an exposure time may be varied.

Referring to FIG. 7, the N frame information 710, N+1 frame information 720, and N+2 frame information 730 may mean lens driving information included in an Nth image frame, an N+1st image frame, and an N+2nd image frame, respectively. In the description related to FIGS. 7, N, N+1, and N+2 indicate the order of image frames according to the lapse of time, and do not mean information of a next frame (e.g., next frame information (NFI)).

In an embodiment, the lens driving information may include at least one of AF position information 701 for enabling the processor 340 to perform an AF function through the actuator 330 or OIS position information 702 for performing an OIS function. For example, the image sensor 320 may include, in an image frame, information for controlling an AF module (e.g., the AF module 432 of FIG. 4) among lens driving information included in a first signal acquired from the processor 340, as the AF position information 701. For another example, the image sensor 320 may include, in the image frame, information for controlling an OIS module (e.g., the OIS module 434 of FIG. 4) among the lens driving information included in the first signal acquired from the processor 340, as the OIS position information 702.

In an embodiment, the N frame information 710 may include first lens driving information 711 acquired by the image sensor 320 from the processor 340 before the Nth exposure 719 of the image sensor 320, and second lens driving information 712 acquired from the processor 340 during the Nth exposure 719 of the image sensor 320. In an embodiment, the first lens driving information 711 and the second lens driving information 712 each may include the AF position information 701 and the OIS position information 702. For example, the first lens driving information 711 of the N frame information 710 may include 'AF Pos X, OIS Pos X'. The 'AF Pos X, OIS Pos X' may mean the lens driving information acquired from the processor 340 before the Nth shutter 790, which is a previous time point before shown in FIG. 7. For another example, since the image sensor 320 acquires the AF position information 701 'AF Pos1' and the OIS position information 702 'OIS Pos1' before the Nth read out 795 after the Nth shutter 790, the second lens driving information 712 of the N frame information 710 may include the 'AF Pos1, OIS Pos1'.

In an embodiment, the N+1 frame information 720 may include first lens driving information 721 acquired by the image sensor 320 from the processor 340 before the N+1st exposure 729 of the image sensor 320, and second lens driving information 722 acquired from the processor 340 during the N+1st exposure 729 of the image sensor 320. For example, the first lens driving information 721 may include lens driving information acquired before an N+1st shutter 790 corresponding to the N+1st exposure 729, and the second lens driving information 722 may include lens driving information acquired before an N+1st read out 795 after the N+1st shutter 790.

In an embodiment, since the image sensor 320 acquires AF position information 'AF Pos2' from the processor 340 before the N+1st shutter 790, the first lens driving information 721 of the N+1 frame information 720 may include 'AF Pos2, OIS Pos1'. When not acquiring new OIS position information, the image sensor 320 may generate an image frame including previous OIS position information. The processor 340 may perform image processing for image data included in an image frame, based on OIS position information included in each image frame. For example, the processor 340 may perform filter processing (e.g., interpolation) for N+1st image data, based on a movement distance and/or movement direction of the lens 310 corresponding to the OIS position information included in the N+1 frame information 720. Accordingly, even when not acquiring the new OIS position information from the processor 340, the image sensor 320 may generate an image frame including previously acquired OIS position information.

In an embodiment, since the image sensor 320 acquires OIS position information 'OIS Pos2' before the N+1st read out 795 after the N+1st shutter 790, the second lens driving information 722 of the N+1 frame information 720 may include 'AF None, OIS Pos2'. When not acquiring new AF information during exposure, the image sensor 320 may generate an image frame including 'AF None', unlike the OIS position information. Since the electronic devices 301, 302, and 303 minimize AF operation during exposure of the image sensor 320, when there is not AF position information acquired before the read out 795 after the shutter 790, the image sensor 320 may generate an image frame not including AF position information.

Referring to FIG. 7, a numeral (e.g., AF Pos1 to AF Pos4, and OIS Pos1 to OIS Pos4) of each AF position information or OIS position information shown in FIG. 7 means the number of lens driving information acquired by the image sensor 320, and does not describe whether it is lens driving information included in which image frame. In an embodiment, the processor 340 may, or may not, present the lens driving information to the image sensor 320 regardless of the number of image frames outputted by the image sensor 320.

In an embodiment, the lens driving information may be lens driving information included in a first signal acquired by the image sensor 320 from the processor 340 in FIG. 3A and FIG. 3B as well, but may be replaced with lens position information acquired by the image sensor 321 from the actuator 330 in FIG. 3C as well.

Figure 8:
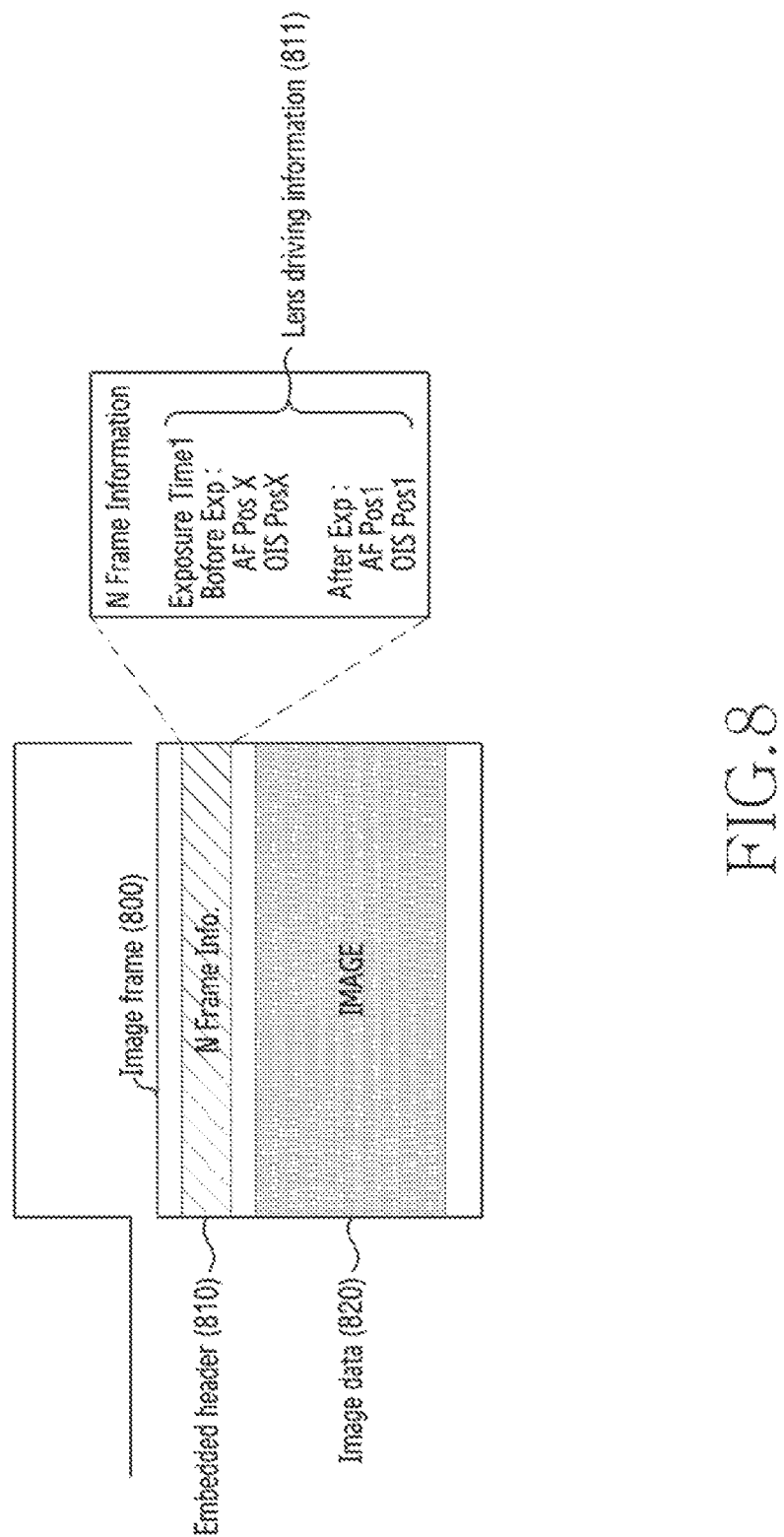
FIG. 8 is a diagram of an example of an image frame including lens driving information according to an example embodiment.

FIG. 8 is a diagram of an example of an image frame 800 including lens driving information 811 according to an example embodiment.

In an embodiment, the image frame 800 presented by the image sensor 320 to the processor 340 may include an embedded header 810 and image data 820. In an embodiment, the lens driving information 811 may be included in the embedded header 810 of the image frame 800. In another embodiment, the lens driving information 811 may be included in an embedded footer of the image frame 800 as well.

In an embodiment, the lens driving information 811 may include the first lens driving information 711 and the second lens driving information 712 described in FIG. 7. In an embodiment, the lens driving information 811 may include the AF position information 701 and the OIS position information 702 described in FIG. 7.

In an embodiment, the processor 340 may perform correction (e.g., VDIS, OIS, chromatic aberration correction, and/or lens distortion correction), for the image data 820, by using the first lens driving information 711 acquired before exposure of the image sensor 320 and the second lens driving information 712 acquired before reading-out of image data after exposure of the image sensor 320. For example, the processor 340 may acquire lens driving information changed during exposure by using the lens driving information 811 acquired before and after exposure of the image sensor 320. The processor 340 may perform correction for the image data 820, based on a position change (or shape change) of the lens 310 driven by the actuator 330 before, during, and after exposure of the image sensor 320.

Figure 9:
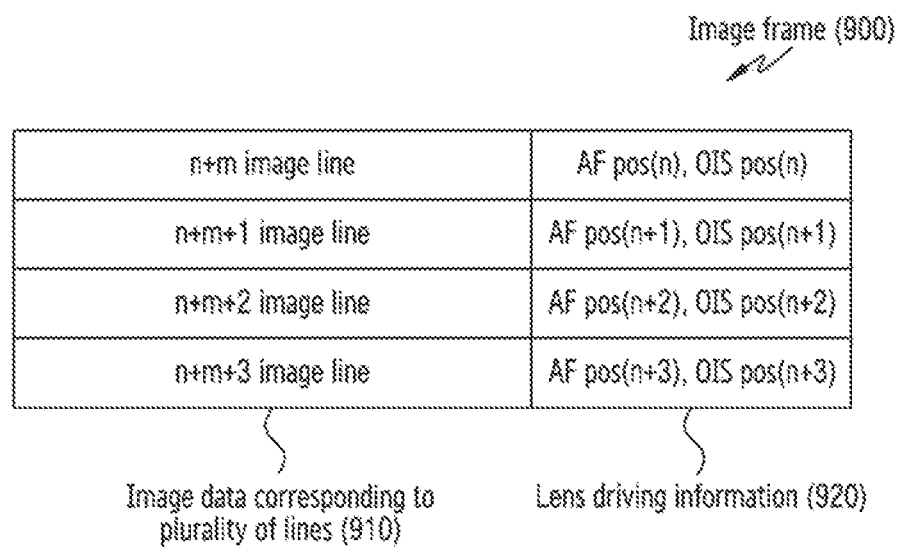
FIG. 9 is a diagram of an example of an image frame including lens driving information according to an example embodiment.

FIG. 9 is a diagram of an example of an image frame 900 including lens driving information 920 according to an example embodiment.

In an embodiment, the image frame 900 presented by the image sensor 320 to the processor 340 may include image data 910 corresponding to a plurality of lines. For example, the image sensor 320 may read out pixel data by the unit of at least one line, and may present data by the unit of at least one line in which read out is carried out. In an embodiment, the image sensor 320 may include the lens driving information 920 in a packet header or packet footer region of each of the plurality of lines of the image data 910. For example, the image sensor 320 may include the lens driving information 920 in a packet footer of each of the plurality of lines, and present the lens driving information 920 to the processor 340.

In an embodiment, the image sensor 320 may not only acquire lens driving information before and after exposure of the image sensor 320 as described in relation to FIG. 7 and FIG. 8, but also may acquire a larger amount of lens driving information 920 while acquiring image data. For example, the image sensor 320 may forward lens driving information of 1 kHz or more to the processor 340. In an embodiment, the image sensor 320 may include the lens driving information 920 in a packet header or packet footer of each of the plurality of lines of the image data 910.

In an embodiment, when the processor 340 presents a first signal including lens driving information to the actuator 330, there may be a predetermined time delay until the actuator 330 drives the lens 310, based on the lens driving information. Accordingly, the image sensor 320 may match Nth lens driving information and n+mth image data. For example, 'm' may be understood to correspond to a delay required for the operation of the actuator 330.

In an embodiment, the lens driving information may be the lens driving information included in the first signal acquired by the image sensor 320 from the processor 340 in FIG. 3A and FIG. 3B as well, but may be replaced with the lens position information acquired by the image sensor 321 from the actuator 330 in FIG. 3C. In an embodiment, when the lens driving information is replaced with the lens position information, the 'm' may be changed into another value.

An electronic device of an embodiment may include a lens, an image sensor for generating image data from incident light which is incident through the lens, an actuator capable of driving the lens, at least one processor for outputting a first signal including lens driving information for controlling the actuator to drive the lens, a first interface for presenting, by the at least one processor, the first signal to the actuator, and a second interface for presenting, by the at least one processor, the first signal to the image sensor.

In the electronic device of embodiment, the actuator may include an AF module and an OIS module.

In the electronic device of embodiment, the lens may be a liquid lens, and the at least one processor may perform an AF function by controlling the AF module to deform a shape of the liquid lens, and perform an OIS function by controlling the OIS module to deform the shape of the liquid lens.

The electronic device of an embodiment may include a motion sensor for detecting a movement of the electronic device. The at least one processor may acquire motion data corresponding to the movement of the electronic device from the motion sensor, and perform an OIS function by controlling the OIS module to move a position of the lens, based on the motion data.

In the electronic device of embodiment, the first interface and the second interface may have a common section.

In the electronic device of embodiment, the first interface and the second interface may be at least one of an I2C, an I3C, or an SPI.

In the electronic device of embodiment, the image sensor may generate the image data from the incident light, and acquire the first signal from the at least one processor through the second interface, and generate an image frame including the image data and the lens driving information.

The electronic device of an embodiment may further include a third interface for presenting, by the image sensor, the image frame to the at least one processor.

In the electronic device of embodiment, the third interface may be a MIPI.

In the electronic device of embodiment, the lens driving information may include first lens driving information acquired by the image sensor from the at least one processor before exposure of the image sensor, and second lens driving information acquired from the at least one processor before reading-out of the image data after exposure of the image sensor, and the lens driving information may be included in an embedded header or embedded footer of the image frame.

In the electronic device of embodiment, the image frame may include the image data corresponding to a plurality of lines, and the lens driving information may be included in a packet header or packet footer of each of the plurality of lines.

In the electronic device of embodiment, the actuator may include an AF module and an OIS module, and the at least one processor may include an AP and an OIS control circuit, and the AP may control the AF module to perform an AF function, and the OIS control circuit may control the OIS module to perform an OIS function.

In the electronic device of embodiment, the AP may generate a second signal for controlling the image sensor, and present the second signal to the image sensor through a fourth interface.

An electronic device of an embodiment may include a lens, an image sensor for generating image data from incident light which is incident through the lens, an actuator capable of driving the lens, at least one processor for outputting a first signal including lens driving information for controlling the actuator to drive the lens, a first interface for presenting, by the at least one processor, the first signal to the actuator, and a second interface for acquiring, by the image sensor, lens position information corresponding to a position of the lens from the actuator.

In the electronic device of embodiment, the actuator may include a Hall sensor for detecting the position of the lens, and the image sensor may request the lens position information to the actuator through the second interface, and in response to the request, receive the lens position information acquired by the Hall sensor, from the actuator through the second interface.

An electronic device of an embodiment may include a lens, an image sensor for generating image data from incident light which is incident through the lens, an actuator capable of driving the lens, and at least one processor connected by an interface with the image sensor and the actuator. The at least one processor may present a first signal including lens driving information for controlling the actuator to drive the lens, to the actuator through at least a first path of the interface, and present the first signal to the image sensor through at least a second path of the interface, and acquire an image frame including the image data and the lens driving information from the image sensor.

In the electronic device of an embodiment, the at least one processor may perform at least one of VDIS, TNR, chromatic aberration correction, and lens distortion correction, for the image data, based on the lens driving information.

In the electronic device of an embodiment, the lens driving information may include at least one of AF position information for performing, by the at least one processor, an AF function through the actuator, or OIS position information for performing, by the at least one processor, an OIS function through the actuator.

In the electronic device of an embodiment, the lens driving information may include first lens driving information acquired by the image sensor from the at least one processor before exposure of the image sensor, and second lens driving information acquired from the at least one processor before reading-out of the image data after exposure of the image sensor, and the lens driving information may be included in an embedded header or embedded footer of the image frame.

In the electronic device of an embodiment, the image frame may include the image data corresponding to a plurality of lines, and the lens driving information may be included in a packet header or packet footer region of each of the plurality of lines.

What is claimed is:

1. An electronic device comprising:
   a lens;
   an image sensor configured to generate image data from incident light that is incident through the lens;
   an actuator configured to drive the lens;
   at least one processor configured to acquire lens driving information from the image sensor and output a first signal including the lens driving information for controlling the actuator to drive the lens;
   a first interface configured to present, by the at least one processor, the first signal to the actuator; and
   a second interface configured to present, by the at least one processor, the first signal to the image sensor.

2. The electronic device of claim 1, wherein the actuator comprises an auto focus (AF) module and an optical image stabilization (OIS) module.

3. The electronic device of claim 2, wherein the lens comprises a liquid lens, and
   wherein the at least one processor is further configured to:
      perform an AF function by controlling the AF module to deform a shape of the liquid lens, and
      perform an OIS function by controlling the OIS module to deform the shape of the liquid lens.

4. The electronic device of claim 2, further comprising a motion sensor configured to detect a movement of the electronic device,
   wherein the at least one processor is further configured to:
      acquire, from the motion sensor, motion data corresponding to the movement of the electronic device, and
      perform, based on the motion data, an OIS function by controlling the OIS module to move a position of the lens.

5. The electronic device of claim 1, wherein the first interface and the second interface comprise a common section.

6. The electronic device of claim 1, wherein the first interface and the second interface are at least one of an inter-integrated circuit (I2C), an improved inter-integrated circuit (I3C), or a serial peripheral interface (SPI).

7. The electronic device of claim 1, wherein the image sensor is further configured to:
generate the image data from the incident light;
acquire the first signal from the at least one processor through the second interface; and
generate an image frame comprising the image data and the lens driving information.

8. The electronic device of claim 7, further comprising a third interface configured to present, by the image sensor, the image frame to the at least one processor.

9. The electronic device of claim 8, wherein the third interface comprises a mobile industry processor interface (MIPI).

10. The electronic device of claim 7, wherein the lens driving information comprises first lens driving information acquired by the image sensor from the at least one processor before exposure of the image sensor, and second lens driving information acquired from the at least one processor before reading-out of the image data after exposure of the image sensor, and
wherein the lens driving information is included in an embedded header or embedded footer of the image frame.

11. The electronic device of claim 7, wherein the image frame comprises the image data corresponding to a plurality of lines, and
wherein the lens driving information is included in a packet header or packet footer of each of the plurality of lines.

12. The electronic device of claim 2, wherein the at least one processor comprises an application processor (AP) and an OIS control circuit,
wherein the AP is configured to control the AF module to perform an AF function, and
wherein the OIS control circuit is configured to control the OIS module to perform an OIS function.

13. The electronic device of claim 12, wherein the AP is further configured to:
generate a second signal for controlling the image sensor; and
present the second signal to the image sensor through a fourth interface.

14. An electronic device comprising:
a lens;
an image sensor configured to generate image data from incident light that is incident through the lens;
an actuator configured to drive the lens;
at least one processor configured to output a first signal including lens driving information for controlling the actuator to drive the lens;
a first interface configured to present, by the at least one processor, the first signal to the actuator; and
a second interface configured to acquire, by the image sensor and from the actuator, lens position information corresponding to a position of the lens,
wherein the at least one processor is further configured to acquire, from the image sensor, an image frame comprising the image data and the lens position information.

15. The electronic device of claim 14, wherein the actuator comprises a Hall sensor configured to detect the position of the lens, and
wherein the image sensor is further configured to:
request, to the actuator through the second interface, the lens position information; and
in response to the request, receive, from the actuator through the second interface, the lens position information acquired by the Hall sensor.

16. An electronic device comprising:
a lens;
an image sensor configured to generate image data from incident light that is incident through the lens;
an actuator configured to drive the lens; and
at least one processor connected by an interface with the image sensor and the actuator,
wherein the at least one processor is configured to:
present, to the actuator through at least a first path of the interface, a first signal comprising lens driving information for controlling the actuator to drive the lens;
present, through at least a second path of the interface, the first signal to the image sensor; and
acquire, from the image sensor, an image frame comprising the image data and the lens driving information.

17. The electronic device of claim 16, wherein the at least one processor is further configured to perform at least one of video digital image stabilization (VDIS), temporal noise reduction (TNR), chromatic aberration correction, or lens distortion correction, for the image data, based on the lens driving information.

18. The electronic device of claim 16, wherein the lens driving information comprises at least one of auto focus (AF) position information for performing, by the at least one processor, an AF function through the actuator, or optical image stabilization (OIS) position information for performing, by the at least one processor, an OIS function through the actuator.

19. The electronic device of claim 16, wherein the lens driving information comprises first lens driving information acquired by the image sensor from the at least one processor before exposure of the image sensor, and second lens driving information acquired from the at least one processor before reading-out of the image data after exposure of the image sensor, and
wherein the lens driving information is included in an embedded header or embedded footer of the image frame.

20. The electronic device of claim 16, wherein the image frame comprises the image data corresponding to a plurality of lines, and
wherein the lens driving information is included in a packet header or packet footer region of each of the plurality of lines.

* * * * *